April 3, 1951 A. B. SEPPMANN 2,547,233
MASTER CYLINDER STRUCTURE
Filed Oct. 14, 1947

Inventor:
Alfred B. Seppmann
By: Bair & Freeman
Attorneys.

Patented Apr. 3, 1951

2,547,233

UNITED STATES PATENT OFFICE 2,547,233

MASTER CYLINDER STRUCTURE

Alfred B. Seppmann, Mankato, Minn.

Application October 14, 1947, Serial No. 779,688

5 Claims. (Cl. 60—54.6)

This invention relates to a master cylinder structure of the single acting high power type wherein the brakes when applied are held in applied position until the brake pedal is released.

One object of the invention is to provide a master cylinder of simple, durable and inexpensive construction which is particularly adapted for trailers and the like and wherein application of the brakes results in the brakes holding even through pressure is partially let up on the brake pedal, the brake pedal being fully released for permitting the brakes to return to their non-applied position.

Another object is to provide a master cylinder having a relief valve to prevent excessive pressures in the hydraulic system, the brake piston being coactible therewith to open the same for return flow of fluid directly to the reservoir when the brake pedal is in its fully released position.

Still another object is to provide a check valve between a master cylinder and the hydraulic line to the brakes to prevent return flow of brake fluid from the brakes to the cylinder, the piston and the cylinder being of the type that permits entry of additional fluid from the reservoir upon partial release of the brake pedal and re-application of the brakes, thus "pumping" additional fluid into the hydraulic system to secure sufficient braking action when the first stroke of the piston is insufficient for applying the brakes to the desired degree.

A further object is to provide a relief valve which is normally free for fluid transfer between the hydraulic line and the reservoir, and which is tensioned to operate in its relief capacity as soon as the brake pedal is depressed slightly.

Figure 1:
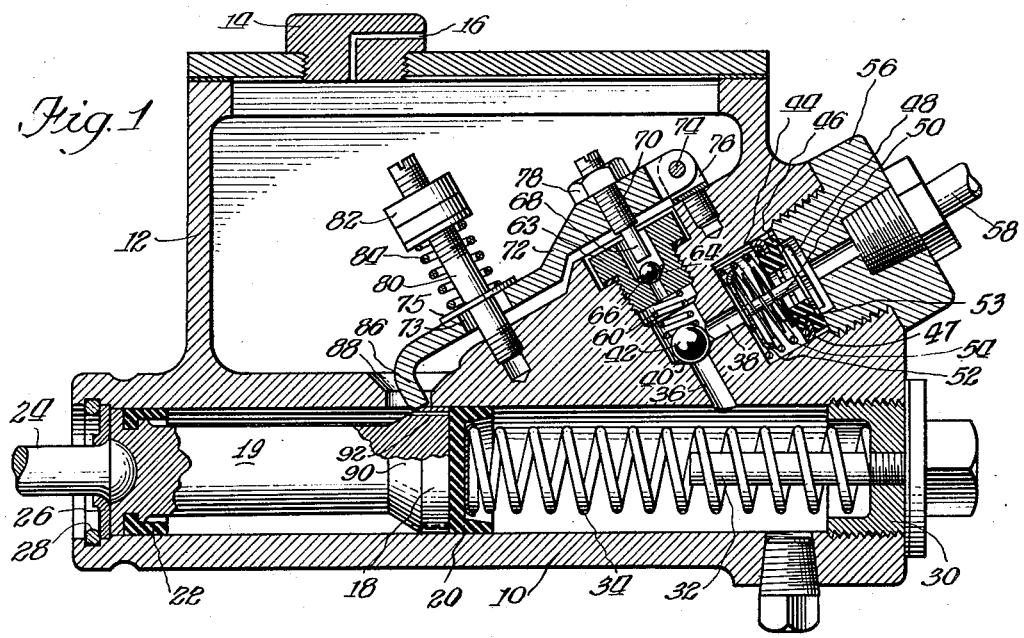
Figure 2:
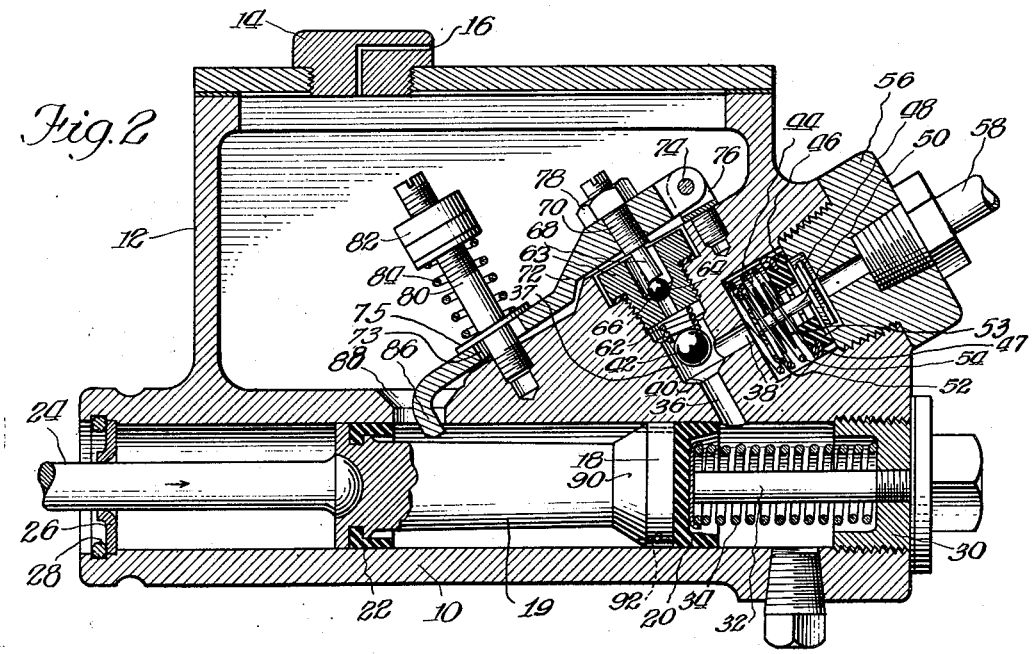

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a vertical sectional view through a master cylinder structure embodying my present invention and showing the parts in the normal position, and Figure 2 is a similar sectional view showing the parts in operating position, that is, with the piston moved forward in the cylinder by depression of the brake pedal and brake fluid being forced from the cylinder to the hydraulic line.

On the accompanying drawing I have used the reference numeral 10 to indicate a cylinder of my structure and 12 a reservoir thereof. The top of the reservoir is closed by means of a closure plug 14 having a vent 16 to atmosphere.

A piston 18 is slidable in the cylinder 10 and has a rearward extension 19. The piston 18 has thereagainst a sealing cup 20 retained in position by a spring 34. The rear end of the extension 19 has a sealing cup 22 and is socketed to receive the forward end of an operating rod 24 extending from the brake pedal. A closure disc 26 is held in position by a retainer ring 28 and serves as a stop for the piston 18 in the normal position of Figure 1.

A closure plug 30 is provided for the forward end of the cylinder 10 and a stop pin 32 is carried thereby to limit the inward movement of the piston 18 as in Figure 2.

A passageway 36 leads from the cylinder 10 to a passageway 38, a valve seat 40 being interposed between the two. A ball type check valve 42 is normally seated on the seat 40 by a spring 62.

The passageway 38 communicates with a cavity 44 closed by a plug 56 with which the hydraulic line to the brake is connected. This line is indicated at 58. A retarder valve is mounted in the cavity 44 and consists of a sealing washer 46 having a metallic insert 47 with a spring 54 interposed between this insert and the bottom of the cavity. The spring 54 normally seats the washer 46 on the inner end of the plug 56.

A valve stem 50 extends through the central opening of the washer 46 and has a valve disc 48 normally seated against the outer face of the washer by a spring 53 interposed between the inner face of the washer and a disc 52 secured to the inner end of the stem 50.

The ball 42 is located in an enlargement 37 of the passageway 36 and the spring 62 is backed by a plug 63 threaded into the enlargement of the passageway. The plug 63 has a valve seat 64 on which a relief valve 66 is at times seated. Such seating as shown in Figure 2 is effected by a pin 68 carried by a lever 72 pivoted at 74 to a bracket 76. The pin 68 has a threaded portion 70 adjustable in the lever, and a lock nut 78 is provided to retain the adjustment. The lever 72 is provided with an opening 73 which surrounds a stud 80 having a spring 84 thereon interposed between a washer 75 and an adjusting nut 82 for the tension of the spring 84.

A port 88 affords communication between the interior of the reservoir 12 and the interior of the cylinder 10. The lever 72 has an extension 86 through the port 88 and this extension is adapted to be engaged by a truncated cone shaped portion 90 of the piston 18 which acts as an actuating cam for the lever 72 as will hereinafter appear.

The piston 18 is provided with bypass ports 92 that permit flow of brake fluid from the cylinder 10 back of the piston to the back of the cup 20 and then around its peripheral flange upon the return stroke of the piston 18 caused by the spring 34 when pressure is let up on the brake pedal.

Practical operation

In the operation of my master cylinder, when the brake pedal is depressed it will move the actuating rod 24 in the direction of the arrow in Figure 2 which will likewise move the extension 19 and the piston 18 in the same direction. This displaces brake fluid (not shown as it would be confusing on the drawing) in the cylinder 10 ahead of the cup 20 through the passageway 36 past the valve seat 40 by lifting the ball 42 therefrom and through the passageway 38 into the cavity 44, the parts being in the position shown in Figure 2. The pressure of the brake fluid on the inner face of the valve disc 48 opens it as shown so that the fluid can flow through the hydraulic line 58 to the brakes.

The brakes can be applied to the degree desired and then pressure can be let up on the brake pedal and the brakes will remain in the applied position and to that same degree because return flow of fluid is blocked by the check valve 42 and by the relief valve 66. Any time the pressure exceeds that for which the spring 84 is set however the excess pressure while applying the brakes will be relieved past the relief valve into the reservoir at any time the fluid pressure exceeds the setting of the relief valve. Thus protection is afforded against excess pressure that might rupture the hydraulic system beyond the master cylinder.

The possibility of the brakes holding even when pressure is let up on the brake pedal makes the braking action less strenuous to the driver as he can apply the brakes to the desired degree without manually holding the brake pedal at that position to maintain the pressure in the hydraulic line. Any pressure that is built up in the line by forward movement of the brake pedal is automatically held so that he can let up on the brake pedal and has to hold it only against the force of the spring 34. Then when it is desirable to release the brake he lets up on the pedal all the way and the cam 90 raises the lever 72 for permitting the relief valve 66 to open and thereby permit the brake fluid to return freely to the reservoir 12.

Such return operates the retarder valve in the usual manner, that is it forces the washer 46 back against the tension of the spring 54 to permit the fluid to flow around the edge of the washer 46 and its metallic insert 47. The insert is in the form of a ring with a plurality of spaced curved prongs around its periphery to provide a seat for the spring 54. The prongs are guided by the interior wall of the cavity 44 while the periphery of the insert is spaced inwardly therefrom to permit free flow of fluid around the insert. This retarder valve however forms no part of my present invention.

By designing the parts of the master cylinder as disclosed I utilize the relief valve itself as a return valve to bypass brake fluid from the hydraulic line to the reservoir past the check valve 42, and the space in the cylinder 10 ahead of the piston 18 is always automatically re-charged with fluid upon the return stroke by reason of atmospheric pressure forcing fluid from the reservoir 12 through the passageways 92 and past the peripheries of the cup 20 while the spring 34 is operating to return the piston to its initial position.

The arrangement is also such that additional brake fluid can be pumped into the system when the initial brake movement is insufficient to apply the brakes to the desired degree. The check valve 42 acts in this case to prevent return flow of brake fluid when pressure on the brake pedal is let up and another charge of liquid is then trapped ahead of the piston 18 during the return movement of the brake pedal nearly to the initial position. The brake pedal of course should not be let up enough for the cam 90 to swing the lever 72 to the position of Figure 1; otherwise the pressure in the brake line will be lost. On the second stroke the trapped liquid ahead of the piston is pumped into the brake line for additional braking effect and the pumping action can be repeated if necessary.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A master cylinder structure comprising a cylinder, a reservoir surmounting said cylinder, a piston in said cylinder, said reservoir having a port communicating said reservoir with said cylinder back of said piston, a return spring for said piston, a passageway communicating with said cylinder in front of said piston, a hydraulic brake line connected with said passageway, a check valve in said passageway opening from the cylinder and toward the brake line, a relief valve from said brake line to said reservoir, means to render said relief valve inoperative comprising a lever pivoted in said reservoir and engaging said relief valve, a spring coacting with said lever to cause said relief valve to engage its seat, said lever having an extension through said port, and said piston having a cam portion cooperable therewith to move said lever against the bias of said last spring, said first spring being stronger than said last spring.

2. A master cylinder structure of the character disclosed comprising a cylinder, a piston in said cylinder, a reservoir communicating with said cylinder back of said piston, a passageway communicating with said cylinder in front of said piston, a hydraulic brake line connected with said passageway, a check valve in said passageway opening from the cylinder and toward the brake line, a relief valve from said brake line to said reservoir, means to render said relief valve inoperative comprising a lever engaging said relief valve, a spring coacting with said lever to cause said relief valve to engage its seat, said lever having a portion in said cylinder, and said piston having a cam portion cooperable therewith to move said lever against the bias of said spring.

3. A master cylinder structure of the character disclosed comprising a cylinder, a reservoir surmounting said cylinder, a piston in said cylinder, a passageway communicating with said cylinder in front of said piston, a hydraulic brake line connected with said passageway, a check valve from said cylinder to said brake line, a relief valve from said brake line to said reservoir, said relief valve being operatively engaged by said piston upon its return to normal position for automatically rendering said relief valve inoperative, 4. In a master cylinder construction having a body provided with a reservoir and a cylinder bore, a piston therein of the type which traps fluid ahead of the piston on the forward stroke and permits flow of fluid past the piston on the return stroke, a hydraulic brake line communicating through said body with the outlet side of said cylinder bore, a check valve therein to hold the hydraulic pressure in the brake line, and a bypass valve for said check valve operable to bypass fluid directly from the outlet side of said check valve to said reservoir, said piston, in its fully retracted position only, effecting opening of said bypass valve.

5. A master cylinder structure comprising a cylinder, a piston therein of the type which traps fluid ahead of the piston on the forward stroke and permits flow of fluid past the piston on the return stroke, a hydraulic brake line communicating with the outlet side of said cylinder, a check valve therein to hold the hydraulic pressure in the brake line, and a bypass valve for said check valve operable to bypass fluid from the brake line to said reservoir, a spring biased element for engaging said bypass valve to normally close it, said element being engaged by said piston upon full release of the brake pedal to permit opening of said bypass valve, said piston disengaging said element whenever said brake pedal is moved away from its full release position so that said element will engage said bypass valve under the bias of the spring for the element to cause the valve to serve as a pressure limiting valve for the brake line whenever such pressure exceeds the setting of the spring.

ALFRED B. SEPPMANN.

REFERENCES CITED

The following references are of record in the file of this patent:

UNITED STATES PATENTS

| Number | Name | Date |
|---|---|---|
| 1,147,579 | Trego | July 20, 1915 |
| 2,000,187 | Oliver | May 7, 1935 |
| 2,081,056 | Loweke | May 18, 1937 |
| 2,161,304 | Loweke | June 6, 1939 |
| 2,242,676 | Jurs | May 20, 1941 |